United States Patent
Aoki et al.

(10) Patent No.: US 10,465,057 B2
(45) Date of Patent: Nov. 5, 2019

(54) METHOD FOR PRODUCING POLYETHYLENE-BASED RESIN LAMINATED FOAM SHEET, POLYETHYLENE-BASED RESIN LAMINATED FOAM SHEET, AND INTERLEAF FOR GLASS PLATE USING THEREOF

(71) Applicant: JSP CORPORATION, Tokyo (JP)

(72) Inventors: Takeshi Aoki, Tochigi (JP); Takashi Nishimoto, Tochigi (JP)

(73) Assignee: JSP CORPORATION, Tokyo (JP)

( * ) Notice: Subject to any disclaimer, the term of this patent is extended or adjusted under 35 U.S.C. 154(b) by 9 days.

(21) Appl. No.: 15/559,551

(22) PCT Filed: Mar. 23, 2016

(86) PCT No.: PCT/JP2016/059168
§ 371 (c)(1),
(2) Date: Sep. 19, 2017

(87) PCT Pub. No.: WO2016/152910
PCT Pub. Date: Sep. 29, 2016

(65) Prior Publication Data
US 2018/0051154 A1 Feb. 22, 2018

(30) Foreign Application Priority Data
Mar. 26, 2015 (JP) .................. 2015-064122

(51) Int. Cl.
*B29C 44/24* (2006.01)
*C08J 9/228* (2006.01)
(Continued)

(52) U.S. Cl.
CPC ............ *C08J 9/228* (2013.01); *B29C 44/24* (2013.01); *B29C 48/18* (2019.02); *B32B 5/20* (2013.01);
(Continued)

(58) Field of Classification Search
CPC ........ C08J 9/228; C08J 2201/03; B29C 44/24
See application file for complete search history.

(56) References Cited

U.S. PATENT DOCUMENTS

| 2014/0070442 A1* | 3/2014 | Morita ................... C08L 23/06 264/46.4 |
| 2015/0218332 A1* | 8/2015 | Nishimoto ................ C08J 9/08 428/220 |

FOREIGN PATENT DOCUMENTS

| JP | 2007-262409 | 10/2007 |
| JP | 2010-42556 | 2/2010 |

(Continued)

OTHER PUBLICATIONS

Sanyo. "Development of Permanent Antistatic Agents Pelectron LMP-FS used in molding films and sheets . . . " Available at https://www.sanyo-chemical.co.jp/eng/topics/2015/02/development-of-permanent-antistatic-agents-pelectron-lmp-fs-used-in-molding-films-and-sheets-useful.html. Published Feb. 26, 2015 (Year: 2015).*

(Continued)

*Primary Examiner* — Michael M Dollinger
*Assistant Examiner* — Christina H. W. Rosebach
(74) *Attorney, Agent, or Firm* — Wenderoth, Lind & Ponack, L.L.P.

(57) ABSTRACT

A method for producing a polyethylene-based resin laminated foam sheet according to the present invention is a method for producing a polyethylene-based resin laminated foam sheet 1 with thickness of 0.05 to 0.5 mm in which an anti-static layer is adhered by lamination on at least one surface of the foam layer, including: a step of performing coextrusion and foaming of a laminate which is obtained by combining and laminating, in a die 10, a melt resin composition 6 for forming a foam layer obtained by kneading a low density polyethylene A and a physical foaming agent and a melt resin composition 9 for forming an anti-static layer obtained by kneading a low density polyethylene B and an anti-static agent, wherein the anti-static agent is a polymeric anti-static agent C which has a melting point to allow a melting point difference in the range of from −10° C. to +10° C. compared to that of the low density polyethylene B and has a melt flow rate of 10 g/10 minutes or more.

9 Claims, 2 Drawing Sheets (51) Int. Cl.
  *B29C 48/18*   (2019.01)
  *B32B 5/20*   (2006.01)
  *B32B 27/18*   (2006.01)
  *C03B 40/033*   (2006.01)
  *C08L 23/06*   (2006.01)
(52) U.S. Cl.
  CPC ............ *B32B 27/18* (2013.01); *C03B 40/033* (2013.01); *C08L 23/06* (2013.01)

(56)  References Cited

FOREIGN PATENT DOCUMENTS

| JP | 2011-79263 | 4/2011 | |
|---|---|---|---|
| JP | 2012-20766 | 2/2012 | |
| JP | 2014-43553 | 3/2014 | |
| WO | 2014/030513 | 2/2014 | |
| WO | WO-2014030513 A1 * | 2/2014 | ................ C08J 9/08 |

OTHER PUBLICATIONS

Machine Translation of JP 08230031 by Shimaoka et al (Year: 1996).*
Derwent Abstract of JP 08230031 by Shimaoka et al. (Year: 1996).*
Machine Translation of JP 2013212594 (Year: 2013).*
English translation of JP 2014-043553 previously cited in an IDS filed on Sep. 19, 2017.
English translation of JP 2011-079263 previously cited in an IDS filed on Sep. 19, 2017.
English translation of JP 2010-042556 previously cited in an IDS filed on Sep. 19, 2017.
International Search Report dated May 10, 2016 in International Application No. PCT/JP2016/059168.

* cited by examiner

METHOD FOR PRODUCING POLYETHYLENE-BASED RESIN LAMINATED FOAM SHEET, POLYETHYLENE-BASED RESIN LAMINATED FOAM SHEET, AND INTERLEAF FOR GLASS PLATE USING THEREOF

TECHNICAL FIELD

The present invention relates to a method for producing a novel polyethylene-based resin laminated foam sheet, a novel polyethylene-based resin laminated foam sheet, and an interleaf for glass plate using thereof.

BACKGROUND ART

Owing to sufficient flexibility and buffering property, a polyethylene-based resin laminated foam sheet (hereinbelow, also referred to as a foam sheet) can prevent a damage or a scratch of a packaged material, and thus it is widely used as a material for packaging home appliances, glass instruments, ceramic wares, or the like.

Furthermore, in accordance with a development of a thin type television and an increasing demand therefor in recent years, a polyethylene-based resin laminated foam sheet having an anti-static layer is used as an interleaf disposed between glass plates to prevent a damage on a surface of glass plate during packaging or conveying of a glass plate for an image display device such as liquid display, plasma display, or electroluminescence display (Patent Literatures 1 and 2).

Until now, as a glass plate used for an image display device such as liquid crystal panel, glass plates with various thicknesses have been developed. Recently, from the viewpoint of having light weight, saving energy, and reducing production cost or the like, a very thin glass plate of which thickness is 0.5 mm or less is also produced. If a conventional thick foam sheet with thickness of 1 mm to 2 mm is used as an interleaf of such thin glass plate, not only the loading efficiency is lowered but also the thickness of the interleaf becomes excessively thick relative to glass plate, and thus there is also a possibility of having breakage of a glass plate depending on the mode for load application.

For such reasons, as an interleaf for responding to such glass plate with low thickness, a development of a foam sheet with low thickness has been made. However, a problem occurs in that, when it is tried to produce a foam sheet with low thickness, it is easy to have a small hole or a through hole occurred in the foam sheet.

To cope with the above problem, the present inventors previously developed a polyethylene-based resin laminated foam sheet having average thickness of 0.5 mm or less based on the use of a special foam adjusting agent (Patent Literatures 3 and 4).

Even with the average thickness of 0.5 mm or less, the polyethylene-based resin laminated foam sheet has high quality in which an occurrence of a small hole or a through hole is prevented and suppressed, and it has an excellent anti-static performance and an excellent buffering property.

CITATION LIST

Patent Literature

Patent Literature 1: JP 2007-262409 A
Patent Literature 2: JP 2012-20766 A
Patent Literature 3: JP 2014-43553 A
Patent Literature 4: WO 2014/030513 A

SUMMARY OF INVENTION

Technical Problem

Although it can be said that the above polyethylene-based resin laminated foam sheet is preferred as an interleaf for a glass plate with low thickness, there is a strong demand for development of a polyethylene-based resin laminated foam sheet with high quality in which an occurrence of a small hole, a through hole, or the like is prevented and suppressed and exhibits an excellent anti-static performance as it remains stable even under continuous production over medium-term period or long-term period like 2 days to 7 days.

The present invention is accomplished under the circumstances described above, and object of the present invention is to provide a method for producing a novel polyethylene-based resin laminated foam sheet which has high quality and exhibits an excellent anti-static performance as it has a prevented and suppressed occurrence of a small hole or a through hole even under continuous production over medium- or long-term period in spite of very low thickness, a novel polyethylene-based resin laminated foam sheet, and an interleaf for a glass plate using thereof.

Solution to Problem

The present invention provides a method for producing a novel polyethylene-based resin laminated foam sheet, a novel polyethylene-based resin laminated foam sheet, and an interleaf for a glass plate using thereof as described below.

<1> A method for producing a polyethylene-based resin laminated foam sheet with thickness of 0.05 to 0.5 mm in which an anti-static layer is adhered by lamination on at least one surface of the foam layer, including:

a step of performing coextrusion and foaming of a laminate which is obtained by combining and laminating, in a die, a melt resin composition for forming a foam layer obtained by kneading a low density polyethylene A and a physical foaming agent and a melt resin composition for forming an anti-static layer obtained by kneading a low density polyethylene B and an anti-static agent, wherein the anti-static agent is a polymeric anti-static agent C which has a melting point to allow a melting point difference in the range of from −10° C. to +10° C. compared to that of the low density polyethylene B and has a melt flow rate of 10 g/10 minutes or more.

<2> The method for producing a polyethylene-based resin laminated foam sheet according to <1>, wherein the low density polyethylene A and the low density polyethylene B have a melt flow rate of 10 to 20 g/10 minutes <3> The method for producing a polyethylene-based resin laminated foam sheet according to <1> or <2>, wherein the melting point of the polymeric anti-static agent C is 120° C. or less.

<4> The method for producing a polyethylene-based resin laminated foam sheet according to any one of <1> to <3>, wherein the ratio of the melt flow rate of the low density polyethylene B relative to the melt flow rate of the polymeric anti-static agent C (that is, melt flow rate of the low density polyethylene B/melt flow rate of the polymeric anti-static agent C) is 2 or less.

<5> The method for producing a polyethylene-based resin laminated foam sheet according to any one of <1> to <4>, wherein basis weight of the anti-static layer is 1 to 5 g/m².
<6> The method for producing a polyethylene-based resin laminated foam sheet according to any one of <1> to <5>, wherein a blending amount of the polymeric anti-static agent C in the anti-static layer is 5 to 300 parts by mass relative to 100 parts by mass of the low density polyethylene B.
<7> A polyethylene-based resin laminated foam sheet having an anti-static layer containing a low density polyethylene B and an anti-static agent adhered by lamination on at least one surface of a foam layer including a low density polyethylene A, wherein the foam sheet has a thickness in the range of 0.05 mm to 0.5 mm and apparent density in the range of 20 to 450 kg/m³, and the anti-static agent is a polymeric anti-static agent C which has a melting point to allow a melting point difference in the range of from −10° C. to +10° C. compared to the low density polyethylene B and has a melt flow rate of 10 g/10 minutes or more, and the polymeric anti-static agent C is blended in an amount of 5 to 300 parts by mass relative to 100 parts by mass of the low density polyethylene B.
<8> An interleaf for a glass plate which is formed of the polyethylene-based resin laminated foam sheet described in <7>.

Advantageous Effects of Invention

According to the production method of the present invention, it is possible to obtain a polyethylene-based resin laminated foam sheet which has high quality with prevented and suppressed occurrence of a small hole or a through hole even under continuous production over short-term period like several hours or medium- to long-term production like several days, and exhibits an excellent anti-static performance with very low thickness.

Furthermore, the novel polyethylene-based resin laminated foam sheet according to the present invention has, in spite of very low thickness, high quality with prevented and suppressed occurrence of a small hole or a through hole and it also exhibits a sufficient anti-static performance.

Therefore, it is expected that, in the field in which an anti-static function is strongly required, there would be a high demand for the novel polyethylene-based resin laminated foam sheet according to the present invention particularly as an interleaf for a glass plate for preventing a damage which occurs during packaging or conveying of thin type glass plate for an image display device such as liquid display, plasma display, or electroluminescence display.

Furthermore, the novel polyethylene-based resin laminated foam sheet of the present invention can be produced continuously over medium- to long-term period, and thus it is a foam sheet with very high industrial production efficiency.

DESCRIPTION OF EMBODIMENTS

The method for producing a polyethylene-based resin laminated foam sheet of the present invention is a method for producing a polyethylene-based resin laminated foam sheet with thickness of 0.05 to 0.5 mm in which an anti-static layer is adhered by lamination on at least one surface of the foam layer, including a step of performing coextrusion and foaming of a laminate which is obtained by combining and laminating, in a die, a melt resin composition for forming a foam layer obtained by kneading a low density polyethylene A and a physical foaming agent and a melt resin composition for forming an anti-static layer obtained by kneading a low density polyethylene B and an anti-static agent, in which the anti-static agent is a polymeric anti-static agent C which has a melting point to allow a melting point difference in the range of from −10° C. to +10° C. compared to the low density polyethylene B and has a melt flow rate of 10 g/10 minutes or more.

Hereinbelow, the method for producing a novel polyethylene-based resin laminated foam sheet according to the present invention and a novel polyethylene-based resin laminated foam sheet obtained by the method are described based on the drawings.

Figure 1:
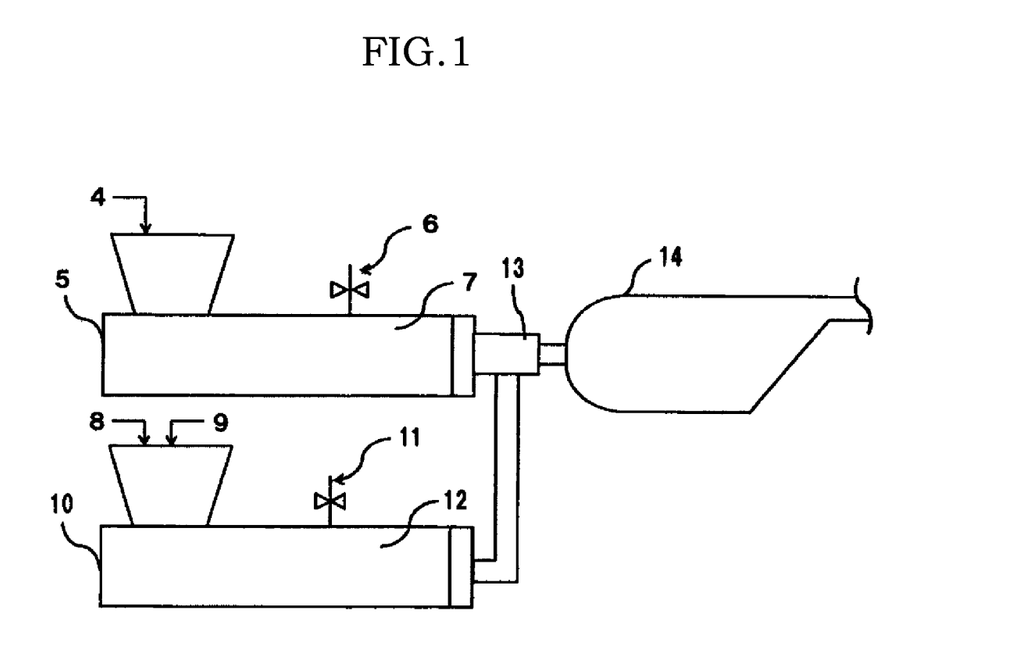
FIG. 1 is a description of a representative method for producing the polyethylene-based resin laminated foam sheet of the present invention.

FIG. 1 is an explanatory drawing of a representative method for producing the polyethylene-based resin laminated foam sheet of the present invention by using a ring die. In FIG. 1, 1 indicates a polyethylene-based resin laminated foam sheet of the present invention, A indicates a low density polyethylene A for forming a foam layer, 4 indicates a first extruder, 5 indicates a physical foaming agent, 6 indicates a melt resin composition for forming a foam layer, 7 indicates a low density polyethylene B for forming an antis-static layer, 8 indicates a polymeric anti-static agent C, 9 indicates a second extruder, 10 indicates a volatile plasticizer, 11 indicates a melt resin composition for forming an anti-static layer, 12 indicates a ring die, and 13 indicates a barrel-shaped laminated foamed article.

Figure 2:
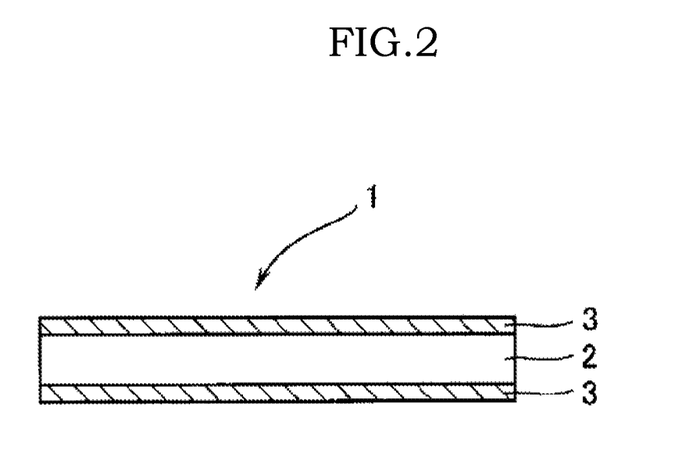
FIG. 2 is a schematic cross-sectional drawing in thickness direction of the polyethylene-based resin laminated foam sheet which is obtained by the production method of the present invention.

FIG. 2 is a schematic cross-sectional drawing of the novel polyethylene-based resin laminated foam sheet 1 which is obtained by the production method of the present invention, in which the anti-static layer 3, 3 (hereinbelow, also simply referred to as the anti-static layer 3) containing the low density polyethylene B and the polymeric anti-static agent C is laminated by coextrusion on both surfaces of the foam layer 2 consisting of the low density polyethylene A (hereinbelow, also simply referred to as the foam layer 2). Meanwhile, although FIG. 2 illustrates the foam sheet 1 in which the anti-static layer 3, 3 is laminated on both surfaces of the foam layer 2, it is also possible to have the foam sheet 1 in which the anti-static layer 3 is laminated only on a single surface of the foam layer 2.

(Method for Producing Polyethylene-Based Resin Laminated Foam Sheet 1)

The method for producing the polyethylene-based resin laminated foam sheet 1 (hereinbelow, also simply referred to as the foam sheet 1) of the present invention is described below. As illustrated in FIGS. 1 and 2, the low density polyethylene A for forming the foam layer 2 and additives such as foam adjusting agent, which are added if required, are first supplied to the first extruder 4 and heated and kneaded at 200° C. or so. Then, after adding the physical foaming agent 5 under pressure followed by kneading again, a melt resin composition 6 for forming a foam layer is produced in the first extruder 4.

Also at the same time, the low density polyethylene B for forming the anti-static layer 3, the polymeric anti-static agent C, and additives which are added if required, are supplied to the second extruder 7 and heated and kneaded at 200° C. or so. Then, after preferably adding a volatile plasticizer 8 followed by kneading again, a melt resin composition 9 for forming an anti-static layer is produced in the second extruder 7.

Then, the melt resin composition 6 for forming a foam layer is cooled to a temperature which is suitable for foaming, and the melt resin composition 9 for forming an anti-static layer is cooled to a temperature such that the temperature is as close as possible to the temperature suitable for foaming.

Subsequently, in the ring die 10 for coextrusion, the melt resin composition 9 for forming an anti-static layer is applied and laminated on an outer peripheral surface of the melt resin composition 6 for forming a foam layer followed by coextrusion of the laminate, and the melt resin composition 6 for forming a foam layer is subjected to foaming. Accordingly, a barrel-shaped laminated foamed article 11 having the anti-static layer 3 formed on the outer peripheral surface of the foam layer 2 is produced. Subsequently, the barrel-shaped laminated foamed article 11 is taken up while being expanded (that is, blow-up) by using a mandrel and cut along the extrusion direction to give the foam sheet 1. Meanwhile, it is also possible that the melt resin composition 9 for forming an anti-static layer is laminated on an inner peripheral surface of the melt resin composition 6 for forming a foam layer.

The melt resin composition 6 for forming a foam layer and the melt resin composition 9 for forming an anti-static layer are controlled in an extruder to have a suitable temperature, and then extruded into air via die. Herein, the suitable temperature for foaming of the melt resin composition 6 for forming a foam layer is a temperature at which a foam layer is easily obtained. The suitable temperature for foaming is preferably in the range of [melting point+0° C.] to [melting point+15° C.], and more preferably in the range of [melting point+2° C.] to [melting point+10° C.] of the low density polyethylene A. Furthermore, the extrusion temperature for extruding the melt resin composition 9 for forming an anti-static layer from an extruder to air via die is preferably in the range of melting point+0° C.] to [melting point+20° C.], and more preferably in the range of [melting point+5° C.] to [melting point+15° C.] of the low density polyethylene B.

(Foam Layer 2)

According to the production method of the present invention, the foam layer 2 is formed by coextrusion of the melt resin composition 6 for forming a foam layer in which the low density polyethylene A, the physical foaming agent 5, and additives such as foam adjusting agent, which are added if required, are blended, and the melt resin composition 9 for forming an anti-static layer followed by foaming. Hereinbelow, materials that are used for producing the foam layer 2 are described in detail.

(Low Density Polyethylene A)

As for the low density polyethylene A, polyethylene having a long chain branch structure and density of 900 kg/m$^3$ or more but less than 930 kg/m$^3$ can be used. This resin exhibits a good foaming property, and the foam sheet 1 to be obtained therefrom has an excellent buffering property, in particular. From this point of view, the density of the low density polyethylene A is preferably 910 kg/m$^3$ or more and 925 kg/m$^3$ or less.

Furthermore, the melting point of the low density polyethylene A is preferably 100 to 120° C. and more preferably 105 to 115° C.

The melting point of the low density polyethylene A can be measured by a method based on JIS K7121-1987. Specifically, by using a differential scanning calorimeter, melting by heating is performed according to increase of the temperature from 40° C. to 200° C. at 10° C./minute. After maintaining at the same temperature for 10 minutes and performing a heat treatment for cooling to 40° C. at 10° C./minutes, the temperature is increased again from 40° C. to 200° C. at heating rate of 10° C./minute to obtain a melting peak. Then, among the obtained melting peaks, the temperature at the top melting peak is taken as a melting point.

Furthermore, the melt flow rate is preferably 5 g/10 minutes or more, more preferably 10 g/10 minutes or more, and even more preferably 15 g/10 minutes or more. The melt flow rate is a value which is measured at temperature of 190° C. and load of 2.16 kg according to JIS K7210-1: 2014.

Meanwhile, when a mixture of 2 or more kinds is used as the low density polyethylene A, the melting point and melt flow rate of the mixture is characterized by the melting point and melt flow rate that are measured for those obtained in advance by melt-kneading using an extruder.

Furthermore, examples of a commercially available product of the low density polyethylene A which is preferably used in the present invention include "Product name NUC8321" (melt flow rate: 1.9 g/10 minutes, melting point 112° C.) manufactured by NUC.

Within the range in which the object and effect of the present invention are not adversely affected, the melt resin composition 6 for forming a foam layer may contain a thermoplastic resin such as a polyethylene resin other than the low density polyethylene A, a polypropylene resin, or a polystyrene resin, or an elastomer such as ethylene propylene rubber or styrene-butadiene-styrene block copolymer.

The aforementioned other polyethylene resin is a resin which has 50% by mole or more of an ethylene component unit, and specific examples thereof include high density polyethylene, linear low density polyethylene, ultra-low density polyethylene, ethylene-vinyl acetate copolymer, ethylene-methyl methacrylate copolymer, ethylene-ethyl acrylate copolymer, and a mixture of 2 or more kinds of them.

The blending amount of the resin or elastomer other than the low density polyethylene A is, relative to 100 parts by mass of the low density polyethylene A, preferably 20 parts by mass or less, more preferably 10 parts by mass or less, and particularly preferably 5 parts by mass or less. By kneading the resin or elastomer other than the low density polyethylene A with the low density polyethylene A, a substrate resin for forming a melt resin composition for forming a foam layer can be prepared.

(Physical Foaming Agent)

According to the method of the present invention, the low density polyethylene A is supplied to an extruder, heated and kneaded to give a melt resin, and subsequently the physical foaming agent 5 is supplied under pressure followed by kneading again, and thus the melt resin composition 6 for forming a foam layer is produced. The physical foaming agent 5 may be either an organic or an inorganic physical foaming agent. Examples of the organic physical foaming agent include hydrocarbons such as propane, normal butane, isobutane, normal pentane, isopentane, normal hexane, or isohexane, alicyclic hydrocarbons such as cyclopentane or cyclohexane, chlorohydrocarbons such as methyl chloride or ethyl chloride, fluorohydrocabons such as 1,1,1,2-tetrafluoroethane or 1,1-difluoroethane, ethers such as dimethyl ether or ethyl methyl ether, and alcohols such as methanol or ethanol.

Examples of the inorganic physical foaming agent include oxygen, nitrogen, carbon dioxide, air, and water. It is possible that the physical foaming agent is used as a mixture of 2 or more types. Among them, from the viewpoint of the foaming property, the organic physical foaming agent is preferable, and among them, those containing normal butane, isobutane, or a mixture of them as a main component are particularly preferable.

The addition amount of the physical foaming agent is adjusted depending on the type of the agent or apparent density of a desired foam layer. For example, when it is desired to obtain a foam sheet with apparent density of 20 to 450 kg/m³ by using a physical foaming agent such as a butane mixture in which 30% by weight of isobutane and 70% by weight of normal butane are admixed with each other as a physical foaming agent, the addition amount is preferably 4 to 35 parts by mass, more preferably 5 to 30 parts by mass, and even more preferably 6 to 25 parts by mass relative to 100 parts by mass of the base substrate for forming the melt resin composition for forming a foam layer.

(Foam Adjusting Agent)

According to the method of the present invention, a foam adjusting agent may be supplied to an extruder, together with the low density polyethylene A. As for the foam adjusting agent, inorganic powder or a chemical foaming agent may be used. Examples of the inorganic powder include talc, zeolite, silica, and calcium carbonate. Examples of the chemical foaming agent include azodicarbonamide, hydrazodicarbonimide, azobisisobutyronitrile, sodium hydrogen carbonate (baking soda), a baking soda-sodium citrate-based chemical foaming agent which is a mixture of sodium hydrogen carbonate and citric acid or monoalkali metal salt of citric acid such as monosodium citrate. Among those chemical foaming agents, to obtain a foam sheet which has a small foam diameter and an excellent buffering property, the baking soda-sodium citrate-based chemical foaming agent is preferable.

In particular, the baking soda-sodium citrate-based chemical foaming agent with average particle diameter of 3 to 8 μm is preferable in that an occurrence of a through hole which penetrates the foam sheet can be more effectively prevented by using thereof. From this point of view, the average particle diameter is more preferably 4 to 7 μm. Furthermore, the maximum particle diameter of the chemical foaming agent is preferably 100 μm or less, and more preferably 80 μm or less.

The average particle diameter indicates a median diameter (d50) which is measured based on laser diffraction scattering type particle size distribution measurement. Furthermore, the maximum particle diameter of a chemical foaming agent is obtained by enlarging and observing, under an optical microscope, a group of particles of about 1 to 3 mg which have been randomly sampled from the chemical foaming agent, and obtaining the long axis diameter of a particle which shows the longest long axis diameter among the group of particles.

The addition amount of the foam adjusting agent is, relative to 100 parts by mass of the base resin for forming the melt resin composition 6 for forming a foam layer, preferably 0.1 to 3 parts by mass, and more preferably 0.2 to 2 parts by mass. When the addition amount is within this range, the foam diameter can be easily adjusted to a desired range, and therefore preferable.

(Other Additives)

In the foam layer 2, within a range in which the effect of the present invention is not negatively affected, various additives may be added. Examples of the additives include an anti-oxidizing agent, a heat stabilizing agent, an anti-weathering agent, a UV absorbing agent, a flame retardant, an inorganic filler, an anti-microbial agent, and a coloring agent.

(Anti-Static Layer 3)

According to the production method of the present invention, the anti-static layer 3 can be formed by coextrusion based on laminating and combining, within a coextrusion die, a melt resin composition for forming an anti-static layer in which the low density polyethylene B, the polymeric anti-static agent C, and, preferably, additives such as a plasticizer are blended, and the melt resin composition for forming a foam layer.

For the coextrusion foaming, an apparatus in which the extruder 4 for forming foam layer and the extruder 7 for forming an anti-static layer are connected to the coextrusion die 10 is used. In the case of the coextrusion foaming, the melt resin composition 6 for forming a foam layer is formed by the extruder 4 for forming foam layer, and at the same, a resin for forming an anti-static layer is supplied to the extruder 7 for forming an anti-static layer, and the melt resin composition 9 for forming an anti-static layer is formed by melt-kneading. As both compositions are combined and laminated in the coextrusion die for coextrusion, a polyethylene-based resin laminated foam sheet is obtained.

(Basis Weight of Anti-Static Layer 3)

The basis weight per single surface of the anti-static layer 3 is preferably in the range of 0.5 to 5 g/m². When the basis weight per single surface of the anti-static layer 3 is within the above range, lamination with a foam layer can be easily carried out so that a thin foam sheet can be provided. In addition, it can be effectively given with the anti-static performance.

From this point of view, the basis weight per single surface is more preferably 0.7 to 4 g/m², and even more preferably 1 to 3 g/m². According to the production method of the present invention, by using a specific anti-static agent described below, a foam sheet with an excellent performance for preventing holes over a medium- to long-term period can be obtained even with low basis weight. The basis weight per single surface of an anti-static layer can be obtained by the following formula (1) in which the extruder ejection amount of a melt resin composition for forming an anti-static layer per single surface is L (kg/hr), taking-up rate for foamed article is M (m/min), and the entire width of foamed article is N (m).

$$\text{Basis weight of anti-static layer (g/m}^2\text{)} = L \times 10^3 / (M \times N \times 60) \quad (1)$$

Hereinbelow, the materials for forming the anti-static layer 3 are described in detail.

(Low Density Polyethylene B)

As for the low density polyethylene B, the same polyethylene as the low density polyethylene A for forming the foam layer 2 can be used from the viewpoint of having excellent production stability due to easiness of coextrusion with a foam layer.

In the present invention, it is necessary to use the polymeric anti-static agent C as an anti-static agent. The polymeric anti-static agent C has a melting point to allow a melting point difference in the range of from −10° C. to +10° C. compared to the low density polyethylene B and has a melt flow rate of 10 g/10 minutes or more.

By using the polymeric anti-static agent C, it becomes possible to obtain the polyethylene-based resin laminated foam sheet 1 which has high quality with suppressed and prevented occurrence of a small hole or a through hole, and exhibits an excellent anti-static function even after the production that is performed continuously over medium- to long-term period.

Although the specific reasons remain unclear, it is believed that, as the polymeric anti-static agent C used in the present invention has a low melting point and a high melt flow rate, such as the polymeric anti-static agent of a prior art which has a high melting point, precipitation of crystals, which causes an occurrence of a small hole or a through hole in a ring die, is suppressed.

The difference between the melting point of the polymeric anti-static agent C and the melting point of the low density polyethylene B used in the present invention ([melting point of the low density polyethylene B]−[melting point of the polymeric anti-static agent C]) is within the range of −10 to +10° C. However, from the viewpoint of obtaining a foam sheet with high quality even by additional continuous operation, the melting point difference is preferably −8 to +8° C., and more preferably −7 to +7° C.

Moreover, the melting point of the polymeric anti-static agent C is preferably 125° C. or less, and more preferably 120° C. or less. Meanwhile, the lower limit of the melting point is generally 100° C. or so.

Meanwhile, the melting point of both of the low density polyethylene B and the polymeric anti-static agent C in an anti-static layer is obtained by the same method as the method described for the low density polyethylene A.

Furthermore, the melt flow rate of the polymeric anti-static agent C is 10 g/10 minutes or more, preferably 20 g/10 minutes or more, and more preferably 30 g/10 minutes or more. Meanwhile, the upper limit is generally 100 g/10 minutes or so. When it is within this range, the anti-static agent can have an excellent fluidity and the anti-static performance is effectively exhibited, and therefore preferable. The melt flow rate of both of the low density polyethylene B and the polymeric anti-static agent C is obtained by the same method as the method described for the low density polyethylene A. Furthermore, the ratio of the melt flow rate of the low density polyethylene B relative to the melt flow rate of the polymeric anti-static agent C (that is, melt flow rate of the low density polyethylene B/melt flow rate of the polymeric anti-static agent C) is preferably 2 or less, more preferably 1 or less, and even more preferably 0.8 or less. When the ratio is within this range, the polymeric anti-static agent C is dispersed in a net shape or a layer shape so that the excellent anti-static performance can be more effectively exhibited. Meanwhile, it is preferable that the lower limit of the ratio be generally 0.01 or more.

The polymeric anti-static agent C which is preferably used in the present invention consists of a block copolymer of polyether and polyolefin, and examples of a commercially available product include Pelectron LMP manufactured by Sanyo Chemical Industries, Ltd. (melting point 114° C., melt flow rate 30 g/10 minutes).

The number average molecular weight of the polymeric anti-static agent C which is used in the present invention is preferably 2000 or more, more preferably 2000 to 100000, and even more preferably 5000 to 80000. Meanwhile, the upper limit of the number average molecular weight of the polymeric anti-static agent is generally 500000. As the number average molecular weight of the polymeric anti-static agent is within the above range, the anti-static performance is more stably exhibited without being influenced by an environmental condition such as humidity.

The number average molecular weight is obtained by using high temperature gel permeation chromatography. For example, when the polymeric anti-static agent contains polyether ester amide or polyether as a main component, it corresponds to a value that is measured at the conditions including that sample concentration is 3 mg/ml with use of orthodichlorobenzene as a solvent, polystyrene is used as a reference material, and the column temperature is set at 135° C. Meanwhile, the solvent type and column temperature are suitably modified depending on a type of the polymeric anti-static agent.

(Blending Amount of the Polymeric Anti-Static Agent C)

The blending amount of the polymeric anti-static agent C in an anti-static layer is, from the viewpoint of having a sufficient anti-static property and obtaining a foam sheet with high quality, preferably 5 to 300 parts by mass, more preferably 7 to 150 parts by mass, and even more preferably 10 to 100 parts by mass relative to 100 parts by mass of the low density polyethylene B for forming an anti-static layer.

(Surface Resistivity of the Anti-Static Layer 3)

According to the present invention, by adding the polymeric anti-static agent C, the surface resistivity on a surface of the anti-static layer 3 can be set at $1 \times 10^7$ to $1 \times 10^{12} \Omega$. If the surface resistivity is within this range, the foam sheet can exhibit a sufficient anti-static property. From this point of view, the surface resistivity is preferably $8 \times 10^{11} \Omega$ or less, and more preferably $5 \times 10^{11} \Omega$ or less.

The surface resistivity according to the present invention is measured based on JIS K6271: 2008 after adjusting the state of the following test specimen. Specifically, a test specimen (length 100 mm×width 100 mm×thickness: thickness of measurement subject) cut out from the foam sheet as a measurement subject was allowed to stand for 36 hours in an atmosphere with temperature of 23° C. and relative humidity of 50% for the acclimation of a test specimen. Subsequently, under the atmosphere with temperature of 23° C. and relative humidity of 50%, voltage is applied at 500 V condition to the test specimen. One minute after starting the application of voltage, the surface resistivity was measured.

(Volatile Plasticizer)

According to the production method of the present invention, it is preferable that the melt resin composition 9 for forming an anti-static layer be added with a volatile plasticizer. As for the volatile plasticizer, those having a function of lowering the melt viscosity of the melt resin composition 9 for forming an anti-static layer and being absent in an anti-static layer according to volatilization from the anti-static layer after forming an anti-static layer are preferably used.

By adding a volatile plasticizer to the melt resin composition for forming an anti-static layer, the melt resin composition for forming an anti-static layer can have, at the time of coextrusion, an effect of lowering the temperature so that the extrusion resin of the melt resin composition for forming an anti-static layer can have a temperature close to the extrusion resin temperature of the melt resin composition for forming a foam layer, and also an effect of improving the elongation property to significantly increase the melt elongation of an anti-static layer in melt state can be obtained. According to the effect of lowering the temperature, it is unlikely that the foam structure in the foam layer is disrupted by heat of the anti-static layer during extrusion foaming. Furthermore, due to the effect of improving the elongation property, the elongation level of the anti-static layer can follow the elongation level of the foam layer at the time of foaming so that an occurrence of cracks on a surface of the foam sheet 1, which is caused by insufficient elongation of an anti-static layer, is prevented.

As for the volatile plasticizer, one or two or more types that are selected from an aliphatic hydrocarbon or an alicyclic hydrocarbon having 2 to 7 carbon atoms, an aliphatic alcohol having 1 to 4 carbon atoms, and an aliphatic ether having 2 to 8 carbon atoms are preferably used. When an agent with low volatility such as lubricating agent is used as a plasticizer, the plasticizer with low volatility may remain on the anti-static layer and contaminate the surface of a material to be packaged such as glass. On the other hand, the volatile plasticizer is preferable in that, as it can plasticize effectively the resin for forming an anti-static layer, the volatile plasticizer itself hardly remains in an anti-static layer to be obtained.

As for the volatile plasticizer, those highly volatile from an anti-static layer are used. The boiling point of the volatile plasticizer is preferably 120° C. or less, and more preferably 80° C. or less. When the boiling point of the volatile plasticizer is within this range, the volatile plasticizer is naturally vaporized and removed from an anti-static layer when the foam sheet 1 obtained after extrusion is allowed to stand. The lower limit of the boiling point is −50° C. in general.

The addition amount of the volatile plasticizer is, relative to total 100 parts by mass of the low density polyethylene B and the polymeric anti-static agent C, preferably 7 parts by mass to 50 parts by mass. From the viewpoint of the effect of lowering the temperature and the effect of improving the elongation property that are described above, the addition amount of the volatile plasticizer is preferably 9 parts by mass or more, and more preferably 10 parts by mass or more.

Meanwhile, when the addition amount of the volatile plasticizer is 50 parts by mass or less in general, the physical properties of an anti-static layer itself are not deteriorated and the volatile plasticizer infiltrates the melt resin composition for forming an anti-static layer and is sufficiently mixed therein. For such reasons, as there is no discharge of volatile plasticizer from a die lip or the like, having a hole in an anti-static layer or having an irregular shape on a surface of a foam sheet can be sufficiently suppressed so that the foam sheet 1 with excellent surface smoothness is obtained. From this point of view, the addition amount of the volatile plasticizer is preferably 40 parts by mass or less, more preferably 30 parts by mass or less, and even more preferably 25 parts by mass or less.

(Other Additives)

In the anti-static layer 3, within a range in which the effect of the present invention is not adversely affected, an additive such as a thermoplastic resin other than the low density polyethylene B, an anti-corrosion agent, an anti-fogging agent, an anti-microbial agent, a coloring agent, a heat stabilizer, an anti-weathering agent, an UV absorbing agent, and a flame retardant may be contained.

With regard to the production method of the present invention, although the reason for having the foam sheet 1 which has high quality with suppressed and prevented occurrence of a small hole or a through hole, and exhibits a sufficient anti-static performance even after the continuous production over medium- to long-term period remains unclear at the present moment, it is believed as follows.

Conventionally, as a polyethylene-based resin foam sheet provided with such kind of anti-static layer, a polymeric anti-static agent with melting point of 135° C. or so to have a melting point difference of +20° C. or more compared to the low density polyethylene-based resin as a base resin has been used as an anti-static agent as described in the following Comparative example. When such conventional polymeric anti-static agent is used, as the temperature within the second extruder is maintained at a high temperature of 200° C. as described above, the polymeric anti-static agent is completely melt in the melt resin composition for forming an anti-static layer so that the crystals of non-melt polymeric anti-static agent are not precipitated.

However, when such melt resin composition for forming an anti-static layer is introduced to the die 13 as described above, it is cooled such that it is as close as possible to the temperature suitable for foaming, and specifically cooled to 120° C. or so (that is, melting point of the low density polyethylene-based resin+10° C. or less or so). Because the melting point of a conventional polymeric anti-static agent is 135° C. or so, it is believed that, at such cooling temperature, part of the polymeric anti-static agent which has been melt in the second extruder is crystallized and precipitated.

Furthermore, when a melt resin composition for forming an anti-static layer containing those precipitated crystals is subjected to coextrusion by laminating and combining it in a coextrusion die with a melt resin composition for forming a foam layer, the precipitated crystals start to remain and adhere on in inner wall of the die. Because the amount of the crystals remained and adhered on an inner wall of the die is small during initial stage (that is, for several hours), the effect on an anti-static layer is minor. However, in the case of a continuous production for 2 days or a continuous production over a long-term period like 7 days, for example, the remaining amount or adhesion amount of the crystals is dramatically increased, and consequently, the melt resin composition for forming an anti-static layer is extruded while it contains the above crystals, and this becomes a reason for having an occurrence of a small hole or a through hole in a foam sheet. It is believed that, in the case of a long and thin foam sheet of the present invention, because the production is performed with narrow die lip clearance, in particular, it is easily affected by those crystals, and thus a small hole or a through hole easily occurs in the foam sheet.

On the other hand, it is believed that, because the polymeric anti-static agent C which has a melting point to allow a melting point difference in the range of from −10° C. to +10° C. compared to the low density polyethylene B and has a melt flow rate of 10 g/10 minutes or more is used as an anti-static agent according to the method of the present invention, crystallization of the polymeric anti-static agent C within a die is prevented or suppressed even at the cooling temperature described above.

Thus, according to the present invention, unlike a case in which a conventional polymeric anti-static agent is used, it is possible to obtain the foam sheet 1 having, in spite of low thickness, high quality with suppressed and prevented occurrence of a small hole or a through hole that is believed to be caused by a polymeric anti-static agent, and exhibiting a sufficient anti-static performance after a short-term production like several hours or even after a continuous production over medium- to long-term period like several days.

As described above, the method for producing a foam sheet of the present invention exhibits excellent continuous productivity because it has suppressed and prevented occurrence of a small hole or a through hole after a short-term production like several hours or even after a continuous production over medium- to long-term period like several days. Thus, regarding the production of a foam sheet according to the present invention, although it may vary depending on thickness and length in width direction, the foam sheet may be wound, during the production, in a roll shape with length of 100 m or more and preferably 300 m or more.

On the other hand, according to the production method of a prior art, there is a possibility of having a defect such as a small hole or a through hole in a foam sheet when continuous production over a medium- or long-term period like several days is performed. In that case, as it is necessary to have an operation of detaching once the foam sheet from a roll, removing the defective area, and winding again the foam sheet in a roll shape, the production efficiency is significantly lowered.

From this point of view, according to the present invention, it is preferable to have a smaller number of through holes with diameter of 1 mm or more that are present in polyethylene-based resin laminated foam sheet. Specifically, after 2 days or 7 days from starting the production, the number of through holes with diameter of 1 mm or more which occur within one hour is preferably less than 3.

(Thickness of Foam Sheet 1)

The thickness (average thickness) of the foam sheet 1 which is obtained by the production method of the present invention is 0.05 mm to 0.5 mm. From the viewpoint of the buffering property and application possibility as an interleaf, the lower limit of the average thickness is preferably 0.07 mm, more preferably 0.1 mm, and even more preferably 0.15 mm. Meanwhile, the upper limit of the average thickness is preferably 0.4 mm, more preferably 0.35 mm, and even more preferably 0.3 mm. The average thickness of the foam sheet can be adjusted to the above range by controlling mostly the apparent density, interval of die lip during extrusion, blow up ratio, and taking-up rate.

The average thickness of the foam sheet 1 can be measured by using an off-line thickness tester TOF-4R manufactured by Yamabun Electronics Co., Ltd. First, over the entire width of the foam sheet, the thickness measurement is performed at 1 cm interval. Based on the thickness of the foam sheet 1 which is measured at 1 cm interval, the arithmetic mean thickness of the entire width is obtained. Meanwhile, as for the foam sheet 1 used for this measurement, a foam sheet which has been acclimated for 24 hours or longer at conditions including temperature of 23±5° C., and relative humidity of 50% is used.

(Apparent Density of Foam Sheet 1)

The apparent density of the foam sheet 1 obtained by the production method of the present invention is preferably in the range of 20 to 450 kg/m$^3$. As the apparent density is within this range, a packaging material such as an interleaf with excellent buffering property is obtained, and therefore desirable. From this point of view, the apparent density is preferably 30 to 300 kg/m$^3$, and more preferably 50 to 200 kg/m$^3$.

Meanwhile, the apparent density of the foam sheet 1 can be obtained by dividing the weight (g/m$^2$) per unit area of a foam sheet by average thickness of the foam sheet 1 followed by unit conversion into [kg/m$^3$]. The apparent density of the foam sheet 1 can be adjusted to the above range mostly by the injection amount of a physical foaming agent and resin temperature.

Furthermore, the ratio between the diameter of a discharge hole of a ring die and the diameter of a mandrel (that is, blow up ratio: diameter of mandrel/diameter of lip part of ring die) is preferably 2.2 to 3.8. When it is within this range, there is no phenomenon of waving in the circumference direction which occurs in conjunction with foaming, and thus excellent thickness precision is obtained. In addition, as there is no excessive flattening of foams in width direction, a favorable foam sheet is obtained, and therefore desirable.

(Foam Sheet 1)

The novel polyethylene-based resin laminated foam sheet of the present invention has, in spite of very low thickness, high quality with prevented and suppressed occurrence of a small hole or a through hole and also exhibits a sufficient anti-static performance as described above.

Thus, the novel polyethylene-based resin laminated foam sheet of the present invention is very useful in the field in which an anti-static function is strongly required, in particular, as an interleaf for a glass plate for preventing a damage which occurs during packaging or conveying of thin type glass plate for an image display device such as liquid display, plasma display, or electroluminescence display. Furthermore, as being producible continuously over medium- to long-term period, it is a foam sheet with very high industrial production efficiency.

EXAMPLES

Hereinbelow, the present invention is described in greater detail in view of Examples and Comparative examples. However, the present invention is not limited to Examples.

[Low Density Polyethylene]

The low density polyethylenes used in Examples and Comparative examples are shown in Table 1.

TABLE 1

| Abbreviation | Type | Density (g/cm$^3$) | Melting point (° C.) | MFR (g/10 min) |
|---|---|---|---|---|
| LDPE1 | Low density polyethylene | 0.917 | 107 | 16.3 |
| LDPE2 | Low density polyethylene | 0.922 | 112 | 2.4 |

The polymeric anti-static agents used in Examples and Comparative examples are shown in Table 2.

TABLE 2

| Abbreviation | Type | | Manufacturer | Product name | Melting point | Intrinsic surface resistance value | MFR |
|---|---|---|---|---|---|---|---|
| Anti-static agent 1 | Polymeric anti-static agent | Polyether-polyolefin block copolymer | Sanyo Chemical Industries, Ltd. | Pelectron LMP | 114° C. | $4 \times 10^6$ Ω/sq. | 30 |
| Anti-static agent 2 | Polymeric anti-static agent | Polyether-polyolefin block copolymer | Sanyo Chemical Industries, Ltd. | Pelectron HS | 135° C. | $4 \times ^6$ Ω/sq. | 6 |
| Anti-static agent 3 | Polymeric anti-static agent | Polyether-polyolefin block copolymer | Sanyo Chemical Industries, Ltd. | Pelestat 300 | 135° C. | $1 \times ^8$ Ω/sq. | 32 |
| Anti-static agent 4 | Polymeric anti-static agent | Ethylene-based ionomer resin | Du Pont-Mitsui Polychemicals Co., Ltd. | SD100 | 92° C. | $3 \times ^6$ Ω/sq. | 5 |

[Foam Adjusting Agent]

The foam adjusting agent used in Examples and Comparative examples is a 1:1 (in weight ratio) mixture of sodium hydrogen carbonate and monosodium citrate, and a chemical foaming agent with average particle diameter of (d50) 6 μm, and maximum particle diameter of 30 μm was used.

[Apparatus]

As an apparatus for producing a foam sheet, an apparatus provided with a first extruder (tandem extruder) in which an extruder for forming a foam layer with inner barrel diameter of 115 mm and an extruder with inner barrel diameter of 150 mm which is connected at the downstream side, and a second extruder for forming an anti-static layer with inner barrel diameter of 65 mm was used. The exit side of the first extruder and the second extruder was connected to the ring die for co-extrusion. Meanwhile, the temperature control of a mold at die lip part was performed for each section resulting from division of the lip part mold into 8 sections.

Examples 1 to 3 and Comparative Examples 1 to 5

For the foam layer, the low density polyethylene and the foam adjusting agent shown in Table 3 were supplied, in the blending shown in Table 3, to an inlet for raw materials of the first extruder followed by kneading under heating to give a melt resin adjusted to 200° C. To the obtained melt resin, mixed butanes containing 70% by weight of normal butane and 30% by weight of isobutane were added under pressure as a physical foaming agent to have the blending amount shown in Table 3 relative to 100 parts by mass of the low density polyethylene followed by kneading under heating. According to subsequent cooling, a melt resin composition for forming a foam layer with resin temperature shown in Table 3 was obtained and the melt resin composition for forming a foam layer was introduced to a ring die for coextrusion. The blending amount of the foam adjusting agent and physical foaming agent shown in Table 3 represents parts by mass of the foam adjusting agent and physical foaming agent relative to 100 parts by mass of the low density polyethylene for forming a foam layer.

At the same time, the low density polyethylene, polymeric anti-static agent shown in Table 3, and the volatile plasticizer shown in Table 3 were introduced to the second extruder followed by kneading under heating at 200° C. According to subsequent cooling, the resin composition was adjusted to the temperature shown in Table 3 to give a melt resin composition for forming an anti-static layer. This melt resin composition for forming an anti-static layer was then introduced to a ring die for coextrusion. To the outer side and inner side of the melt resin composition for forming a foam layer in the ring die for coextrusion, the melt resin composition for forming an anti-static layer was applied and laminated. According to extrusion of a laminated melt product to air via the die lip, a barrel-shaped laminated foamed article with three layer structure including anti-static layer/foam layer/anti-static layer was formed. The laminated foamed article was taken up at the rate shown in Table 3 while being expanded by a mandrel at blow up ratio shown in Table 3. Furthermore, according to cutting along the extrusion direction, it was wound in a roll body with pre-determined length to obtain a foam sheet in which the anti-static layer is adhered by lamination on both surfaces of a foam layer. The blending amount of the volatile plasticizer shown in Table 3 represents parts by mass of the volatile plasticizer relative to total 100 parts by mass of the low density polyethylene for forming an anti-static layer and the polymeric anti-static agent.

Physical properties of the foam sheet obtained from Examples or Comparative examples are shown in Table 4.

TABLE 3

| | Foam layer | | | Anti-static layer | | | | | Conditions for production | | | | | | |
|---|---|---|---|---|---|---|---|---|---|---|---|---|---|---|---|
| | Resin | Foam adjusting agent | Foaming agent | Resin | | | | Volatile plasticizer | Resin temperature | | Discharge amount | | | | |
| | | | | | MFR | | Melting | | | | Outer side of | Inner side of | | |
| | | Blending | Blending | Blending | | Blending | ratio (LDPE/ Anti-static agent) | point difference ° C. | Blending | | Anti-static | | anti-static | anti-static | Taking-up rate | Blow up |
| | Type | amount Parts by mass | amount Parts by mass | amount Parts by mass | Type | amount Parts by mass | | | amount Parts by mass | Foam layer ° C. | Foam layer ° C. | Foam layer kg/h | layer kg/h | layer kg/h | m/min | ratio |
| Example 1 | LDPE 1 | 100 | 1.9 | 12.2 | LDPE 1/ Anti-static agent 1 | 90/10 | 0.54 | 7 | 14 | 110 | 122 | 90 | 7 | 7 | 74.4 | 3.32 |
| Example 2 | LDPE 2 | 100 | 1.2 | 18.2 | LDPE 2/ Anti-static agent 1 | 90/10 | 0.08 | 2 | 20 | 114 | 122 | 90 | 7 | 7 | 52.5 | 3.62 |
| Example 3 | LDPE 1 | 100 | 1.9 | 12.2 | LDPE 1/ Anti-static agent 1 | 70/30 | 0.54 | 7 | 14 | 110 | 122 | 90 | 7 | 7 | 74.4 | 3.32 |
| Comparative example 1 | LDPE 1 | 100 | 2.1 | 12.1 | LDPE 1/ Anti-static agent 2 | 90/10 | 2.72 | 28 | 14 | 110 | 122 | 90 | 7 | 7 | 73.7 | 3.32 |

TABLE 3-continued

| | Foam layer | | | Anti-static layer | | | | Conditions for production | | | | | | |
|---|---|---|---|---|---|---|---|---|---|---|---|---|---|---|
| | Resin | Foam adjusting agent | Foaming agent | Resin | | | Volatile plasticizer Blending amount Parts by mass | Discharge amount | | | | | | |
| | | | | | MFR ratio (LDPE/Anti-static agent) | Melting point difference ° C. | | Resin temperature | | | Outer side of anti-static layer kg/h | Inner side of anti-static layer kg/h | Taking-up rate m/min | Blow up ratio |
| | Type | Blending amount Parts by mass | Blending amount Parts by mass | Blending amount Parts by mass | Type | Blending amount Parts by mass | | | | Foam layer ° C. | Anti-static Foam ° C. | Foam layer kg/h | | | |
| Comparative example 2 | LDPE 1 | 100 | 2.0 | 12.2 | LDPE 1/Anti-static agent 3 | 90/10 | 0.51 | 28 | 14 | 110 | 122 | 90 | 7 | 7 | 75.0 | 3.32 |
| Comparative example 3 | LDPE 1 | 100 | 2.0 | 12.1 | LDPE 1/Anti-static agent 4 | 90/10 | 3.26 | −15 | 14 | 110 | 122 | 90 | 7 | 7 | 74.7 | 3.32 |
| Comparative example 4 | LDPE 1 | 100 | 1.9 | 12.2 | LDPE 1/Anti-static agent 4 | 60/40 | 3.26 | −15 | 14 | 110 | 122 | 90 | 7 | 7 | 78.6 | 3.32 |
| Comparative example 5 | LDPE 2 | 100 | 1.3 | 18.5 | LDPE 2/Anti-static agent 3 | 90/10 | 0.08 | 23 | 20 | 114 | 122 | 90 | 7 | 7 | 54.5 | 3.62 |

TABLE 4

| | Entire foam sheet | | | | Anti-static layer Basis weight per single surface (g/m²) | Evaluation | | |
|---|---|---|---|---|---|---|---|---|
| | | | | | | Hole resistance | | |
| | Thickness (mm) | Apparent density (kg/m³) | Basis weight (g/m²) | Width (mm) | | Medium term (2 days) | Long term (7 days) | Surface resistivity (Ω) |
| Example 1 | 0.22 | 101 | 22.2 | 1050 | 1.5 | excellent | good | $6.2 \times 10^{11}$ |
| Example 2 | 0.48 | 52 | 25.0 | 1320 | 1.7 | excellent | good | $2.8 \times 10^{11}$ |
| Example 3 | 0.23 | 96 | 22.1 | 1050 | 1.5 | excellent | good | $3.6 \times 10^{10}$ |
| Comparative example 1 | 0.21 | 106 | 22.3 | 1055 | 1.5 | poor | bad | $5.5 \times 10^{11}$ |
| Comparative example 2 | 0.23 | 96 | 22.0 | 1050 | 1.5 | poor | bad | $4.2 \times 10^{12}$ |
| Comparative example 3 | 0.23 | 96 | 22.0 | 1055 | 1.5 | good | good | $3.3 \times 10^{15}$ |
| Comparative example 4 | 0.23 | 96 | 22.1 | 1050 | 1.5 | bad | — | $1.2 \times 10^{12}$ |
| Comparative example 5 | 0.47 | 52 | 24.3 | 1310 | 1.7 | good | poor | $2.4 \times 10^{12}$ |

(Result of Evaluation of Table 4)

From Table 4, it was found that the foam sheet obtained in Examples 1 to 3 exhibited a prevented and suppressed occurrence of a through hole on its surface not only for a medium-term continuous production like 48 hours (that is, 2 days) but also for a long-term continuous production like 168 hours (that is, 7 days) as a specific polymeric anti-static agent which has a melting point difference of +7° C. compared to the low density polyethylene B is used (the anti-static agent 1: melting point 114° C.). In addition, the anti-static performance is sufficiently exhibited. Thus, it was found that the foam sheet of the present invention is an industrially highly valuable foam sheet which has an anti-static performance and can be produced stably in a large amount.

On the other hand, in the foam sheet obtained from Comparative examples 1 and 2, a polymeric anti-static agent which has a high melting point (135° C.) to exhibit a melting point difference of 28° C. compared to the low density polyethylene is used (the anti-static agent 2, the anti-static agent 3). For a medium-term continuous production like 48 hours (that is, 2 days), a through hole has been already shown, and for a long-term continuous production like 168 hours (that is, 7 days), the occurrence of a through hole was more significant, showing low production efficiency.

In the foam sheet obtained from Comparative example 3, a polymeric anti-static agent which exhibits a melting point difference of −15° C. compared to the low density polyethylene is used (the anti-static agent 4: melting point 92° C.). In this case, when the blending amount is small, a high-quality foam sheet having no occurrence of a small hole or a through hole was obtained but a sufficient anti-static performance was not exhibited. In this connection, if the blending amount is increased to have sufficient exhibition of the anti-static performance similarly to Comparative example 4, the anti-static agent 4 with low melt flow rate is present in a large amount so that the film forming of an anti-static layer itself is difficult to achieve. Accordingly, it was difficult to stably produce a foam sheet.

Compared to Example 2, it is found from the foam sheet obtained from Comparative example 5 that an anti-static agent having a large melting point difference compared to the low density polyethylene-based resin is not suitable for long-term continuous production.

Meanwhile, various physical properties of Table 4 were measured as described below.

(Thickness of Foam Sheet)

The average thickness of the foam sheet was measured by using an off-line thickness tester TOF-4R manufactured by Yamabun Electronics Co., Ltd. First, over the entire width of the foam sheet, the thickness measurement was performed at 1 cm interval. Based on the thickness of the foam sheet which has been measured at 1 cm interval, the arithmetic mean thickness of the entire width is obtained. Meanwhile, as for the foam sheet used for this measurement, a foam sheet which has been acclimated for 48 hours or longer at conditions including temperature of 23±5° C., and relative humidity of 50% was used.

(Basis Weight of Foam Sheet)

As for the basis weight of a foam sheet, a rectangular test specimen with width of 250 mm was cut out from the entire width of a foam sheet. The weight (g) of the test specimen was divided by the area of the test specimen (sheet width (mm)×250 mm), and after conversion into weight (g) of laminated foam plate per 1 m², it was used as basis weight (g/m²) of a foam sheet.

(Apparent Density of Foam Sheet)

The apparent density of a foam sheet was obtained by dividing the basis weight (g/m²) of a foam sheet, which is obtained by the above method, by the average thickness of a foam sheet obtained as above.

(Basis Weight Per Single Surface of Anti-Static Layer)

The basis weight per single surface of an anti-static layer can be obtained by the following formula (1) in which the extruder ejection amount of a melt resin composition for forming an anti-static layer per single surface is L (kg/hr), taking-up rate for foamed article is M (m/min), and the entire width of foamed article is N (m).

$$\text{Basis weight of anti-static layer (g/m}^2\text{)} = L \times 10^3 / (M \times N \times 60) \quad (1)$$

(Occurrence of Through Hole or the Like)
(Medium Term)

By using a defect detector at the time of producing a foam sheet, the surface of a foam sheet was observed, 48 hours after starting the production, for 1 hour. Then, the evaluation was made according to the following criteria.

excellent: after 48 hours, number of through holes with a size of 1 mm or larger which occur within 1 hour was 0.

good: after 48 hours, number of through holes with a size of 1 mm or larger which occur within 1 hour was less than 3.

poor: after 48 hours, number of through holes with a size of 1 mm or larger which occur within 1 hour was 3 or more but less than 5.

bad: after 48 hours, number of through holes with a size of 1 mm or larger which occur within 1 hour was 5 or more.

(Long Term)

By using a defect detector at the time of producing a foam sheet, the surface of a foam sheet was observed, 168 hours after starting the production, for 1 hour. Then, the evaluation was made according to the following criteria.

good: after 168 hours, number of through holes with a size of 1 mm or larger which occur within 1 hour was less than 3.

poor: after 168 hours, number of through holes with a size of 1 mm or larger which occur within 1 hour was 3 or more but less than 5.

bad: after 168 hours, number of through holes with a size of 1 mm or larger which occur within 1 hour was 5 or more.

-: not possible to perform an evaluation (that is, not possible to produce a foam sheet).

(Surface Resistivity)

The surface resistivity was measured based on JIS K6271: 2008 after performing the acclimation of a test specimen described below. Specifically, five pieces of test specimen (length 100 mm×width 100 mm×thickness: thickness of measurement subject) cut out randomly from the foam sheet as a measurement subject were allowed to stand for 36 hours in an atmosphere with temperature of 23° C. and relative humidity of 50% for the acclimation of a test specimen. Subsequently, under the atmosphere with temperature of 23° C. and relative humidity of 50%, voltage is applied at 500 V condition to both surfaces of the test specimen. One minute after starting the application of voltage, the surface resistivity was measured, and its arithmetic mean value (5 pieces of test specimen×both surfaces [n=10]) was used as the surface resistivity of a laminated foam sheet.

REFERENCE SIGNS LIST

1 Low density polyethylene-based resin laminated foam sheet (foam sheet)
2 Foam layer
3 Anti-static layer
A Low density polyethylene A for forming foam layer
4 First extruder
5 Physical foaming agent
6 Melt resin composition for forming foam layer
B Low density polyethylene B for forming anti-static layer
C Polymeric anti-static agent C
7 Second extruder
8 Volatile plasticizer
9 Melt resin composition for forming anti-static layer
10 Ring die
11 Barrel-shaped laminated foamed article

The invention claimed is:

1. A method for producing a polyethylene-based resin laminated foam sheet in a roll shape with thickness of 0.05 to 0.5 mm in which an anti-static layer is adhered by lamination on at least one surface of the foam layer, comprising:
   a step of performing coextrusion and foaming of a laminate which is obtained by combining and laminating, in a die, a melt resin composition for forming a foam layer obtained by kneading a low density polyethylene A and a physical foaming agent and a melt resin composition for forming an anti-static layer obtained by kneading a low density polyethylene B and an anti-static agent, and a step of rolling the laminate to produce a polyethylene-based resin laminated foam sheet in a roll shape, wherein the anti-static agent is a polymeric anti-static agent C which has a melting point to allow a melting point difference in the range of from −10° C. to +10° C. compared to that of the low density polyethylene B and has a melt flow rate of 10 g/10 minutes or more, and wherein the low density polyethylene B has a melt flow rate of about 15 g/10 minutes or more.

2. The method for producing a polyethylene-based resin laminated foam sheet in a roll shape according to claim 1, wherein the low density polyethylene A has a melt flow rate of 10 to 20 g/10 minutes, and wherein the low density polyethylene B has a melt flow rate of about 15 g/10 minutes to 20 g/10 minutes.

3. The method for producing a polyethylene-based resin laminated foam sheet in a roll shape according to claim 1, wherein the melting point of the polymeric anti-static agent C is 120° C. or less.

4. The method for producing a polyethylene-based resin laminated foam sheet in a roll shape according to claim 1, wherein the ratio of the melt flow rate of the low density polyethylene B relative to the melt flow rate of the polymeric anti-static agent C (that is, melt flow rate of the low density polyethylene B/melt flow rate of the polymeric anti-static agent C) is 2 or less.

5. The method for producing a polyethylene-based resin laminated foam sheet in a roll shape according to claim 1, wherein basis weight of the anti-static layer is in the range of 1 to 5 g/m².

6. The method for producing a polyethylene-based resin laminated foam sheet in a roll shape according to claim 1, wherein a blending amount of the polymeric anti-static agent C in the anti-static layer is 5 to 300 parts by mass relative to 100 parts by mass of the low density polyethylene B.

7. A polyethylene-based resin laminated foam sheet having an anti-static layer containing a low density polyethylene B and an anti-static agent adhered by lamination on at least one surface of a foam layer comprising a low density polyethylene A, wherein the foam sheet has a thickness in the range of 0.05 mm to 0.5 mm and apparent density in the range of 20 to 450 kg/m³, and the anti-static agent is a polymeric anti-static agent C which has a melting point to allow a melting point difference in the range of from −10° C. to +10° C. compared to the low density polyethylene B and has a melt flow rate of 10 g/10 minutes or more, and the polymeric anti-static agent C is blended in an amount of 5 to 300 parts by mass relative to 100 parts by mass of the low density polyethylene B, and wherein the low density polyethylene B has a melt flow rate of about 15 g/10 minutes or more.

8. An interleaf for a glass plate which is formed of the polyethylene-based resin laminated foam sheet described in claim 7.

9. The method for producing a polyethylene-based resin laminated foam sheet in a roll shape according to claim 1, wherein the low density polyethylene A is consisting essentially of low density polyethylene.

* * * * *